(12) United States Patent
Kato

(10) Patent No.: US 12,030,160 B2
(45) Date of Patent: Jul. 9, 2024

(54) FOREIGN BODY REMOVING DEVICE

(71) Applicant: HONDA MOTOR CO., LTD., Tokyo (JP)

(72) Inventor: Daisuke Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 496 days.

(21) Appl. No.: 17/177,253

(22) Filed: Feb. 17, 2021

(65) Prior Publication Data

US 2021/0276138 A1 Sep. 9, 2021

(30) Foreign Application Priority Data

Mar. 5, 2020 (JP) .................................. 2020-037356
Dec. 15, 2020 (JP) .................................. 2020-207463

(51) Int. Cl.
*B24B 9/00* (2006.01)
*B23K 26/70* (2014.01)

(52) U.S. Cl.
CPC .............. *B24B 9/00* (2013.01); *B23K 26/702* (2015.10)

(58) Field of Classification Search
CPC ...... B24B 9/00; B23K 26/702; B23K 26/142; B23K 26/16; B23K 26/38; B26D 7/1854; B26D 7/18
See application file for complete search history.

(56) References Cited

U.S. PATENT DOCUMENTS

| 7,241,965 B2 * | 7/2007 | Burt .................... B23K 26/1438 |
| | | 219/121.84 |
| 2002/0023905 A1 | 2/2002 | Fukaya et al. |
| 2014/0238961 A1 | 8/2014 | Kato |
| 2017/0252941 A1 * | 9/2017 | Adams ................... H04N 23/60 |

FOREIGN PATENT DOCUMENTS

| DE | 3829682 A * | 3/1989 | ........... B26D 7/1854 |
| JP | 61-195915 | 12/1986 | |
| JP | 63-181493 | 11/1988 | |
| JP | 2002-035973 | 2/2002 | |
| JP | 2014-124685 | 7/2014 | |
| JP | 2014-161895 | 9/2014 | |
| JP | 2017-042857 | 3/2017 | |
| JP | 2017-119262 | 7/2017 | |

OTHER PUBLICATIONS

Machine Translation of DE 3829682 A (Year: 1989).*
Japanese Office Action for Japanese Patent Application No. 2020-207463 dated Jan. 30, 2024.
Japanese Office Action for Japanese Patent Application No. 2020-207463 dated Sep. 5, 2023.

* cited by examiner

*Primary Examiner* — Christopher J Besler
(74) *Attorney, Agent, or Firm* — Amin, Turocy & Watson, LLP

(57) ABSTRACT

A foreign body removing device includes a foreign body removing tool for removing a foreign body that has adhered to a surface of a workpiece. This foreign body removing tool includes: a grip to be grasped by a worker; a blade that contacts the foreign body; and an airflow delivering portion for delivering compressed gas that has been supplied from a compressed gas supply source, as an airflow contacting the blade.

7 Claims, 14 Drawing Sheets

FOREIGN BODY REMOVING DEVICE

CROSS-REFERENCE TO RELATED APPLICATIONS

This application is based upon and claims the benefit of priority from Japanese Patent Applications No. 2020-037356 filed on Mar. 5, 2020 and No. 2020-207463 filed on Dec. 15, 2020, the contents all of which are incorporated herein by reference.

BACKGROUND OF THE INVENTION

Field of the Invention

The present invention relates to a foreign body removing device for removing from a workpiece a foreign body generated when implementing processing on the workpiece, and specifically relates to a foreign body removing device suitable when removing dross generated during laser processing.

Description of the Related Art

In a combustor of a gas turbine engine, a high temperature is attained due to compressed air and fuel being combusted. In order to protect the combustor at this time, for example, a large number of cooling through-holes of small diameter are formed in a dome portion configuring the combustor. Now, the cooling through-hole extends inclining with respect to a thickness direction of the dome portion. This is because since overall length of the through-hole increases due to inclination, there is an advantage that cooling efficiency increases.

It is not easy, and, moreover, requires a long time for a through-hole inclining with respect to a thickness direction of a member in this way to be formed by drilling. Accordingly, this kind of through-hole is generally formed by laser processing employing a laser beam. However, in laser processing, a workpiece melts during irradiation of the laser beam, whereby spatter is generated and adheres to the workpiece as dross. If the member with the dross left adhered thereto is employed to configure the combustor, then cooling efficiency will drop due to heat capacity of the dross, so the dross needs to be removed.

As devices that remove dross, there are known devices described in Japanese Laid-Open Patent Publication No. 2014-124685 and Japanese Laid-Open Patent Publication No. 2017-042857. The device described in Japanese Laid-Open Patent Publication No. 2014-124685 comprises a needle, and the needle repeats an advancing operation of projecting to a chisel-outside and a retracting operation of withdrawing to a chisel-inside. It is thereby being attempted to remove dross that has adhered to a surface of a workpiece support. On the other hand, in technology described in Japanese Laid-Open Patent Publication No. 2017-042857, a configuration is adopted whereby a vertically held workpiece is contacted by a rotating brush.

SUMMARY OF THE INVENTION

In the case where an object having dross removed is a member configuring a combustor, the member has cooling through-holes formed therein as described above. In the case of the advancing or retracting needle described in Japanese Laid-Open Patent Publication No. 2014-124685, or the member being contacted by the rotating brush described in Japanese Laid-Open Patent Publication No. 2017-042857, there is concern that dross that has separated from the surface of the workpiece will intrude into the cooling through-holes. If such a situation arises, it will lead to a state that the cooling through-holes are blocked. In this case, cooling efficiency of the combustor will end up dropping.

A main object of the present invention is to provide a foreign body removing device by which it is easy for a foreign body such as dross to be removed from a workpiece.

Another object of the present invention is to provide a foreign body removing device by which it is possible to dispel concern that, in the case of a through-hole being formed in a workpiece, the through-hole will be blocked by a foreign body.

According to an embodiment of the present invention, there is provided a foreign body removing device including: a foreign body removing tool configured to remove a foreign body that has adhered to a surface of a workpiece; and a compressed gas supply source, the foreign body removing tool including:
a grip configured to be gripped by a worker;
a blade that extends from the grip and contacts the foreign body; and
an airflow delivering portion configured to deliver compressed gas that has been supplied from the compressed gas supply source, as an airflow contacting the blade.

Due to the present invention, the blade that has contacted the foreign body causes a flaw (a crack) to occur in the foreign body, and, furthermore, the compressed gas that has been supplied so as to contact the blade causes the foreign body to disintegrate starting with the flaw. Therefore, the foreign body can easily be removed from the workpiece.

Moreover, the foreign body is blown by the compressed gas (the airflow). Due to this blowing, even if a through-hole is formed in the workpiece, the foreign body is prevented from intruding into the through-hole. That is, concern that the through-hole will be blocked by the foreign body is dispelled.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a foreign body removing device according to the present invention will be presented and described in detail below with reference to the accompanying drawings. Note that in this embodiment, there is exemplified a dross removing device by which dross generated during laser processing is removed as a foreign body.

Figure 1:
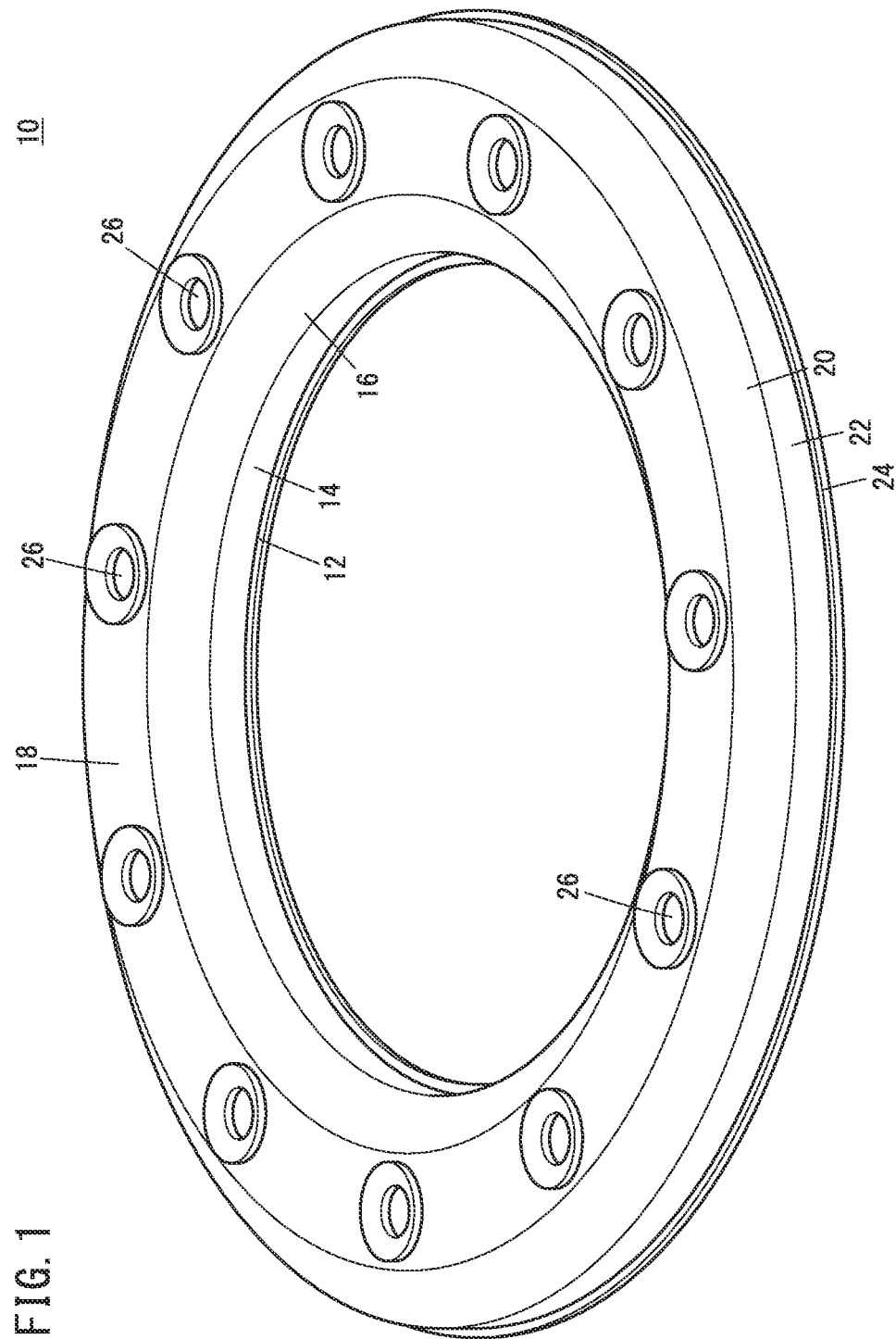
FIG. 1 is a schematic overall perspective view of a ring body being a workpiece on which laser processing is implemented.

First, a ring body 10 (a workpiece) shown in FIG. 1 will be described. This ring body 10 has an inner flange 12, an inner vertical wall 14, an inner inclined wall 16, a cover portion wall 18, an outer inclined wall 20, an outer vertical wall 22, and an outer flange 24 in this order from an inner side to an outer side in a diametric direction. Of these, the inner flange 12 projects inwardly in the diametric direction from an inner peripheral edge portion of the inner vertical wall 14, and circles in a ring-shaped manner. On the other hand, the outer flange 24 projects outwardly in the diametric direction from an outer peripheral edge portion of the outer vertical wall 22, and circles in a ring-shaped manner.

The inner vertical wall 14 rises substantially vertically from an outer edge in the diametric direction of the inner flange 12, and the inner inclined wall 16 is formed so as to be bent toward the outer side in the diametric direction from a rise tip of the inner vertical wall 14. Similarly, an inner edge in the diametric direction of the outer flange 24 has joined thereto the outer vertical wall 22 which rises substantially vertically, and, furthermore, a rise tip of the outer vertical wall 22 has joined thereto the outer inclined wall 20 which is bent toward the inner side in the diametric direction. Moreover, the inner inclined wall 16 and the outer inclined wall 20 are straddled by the cover portion wall 18 which is substantially parallel to the inner flange 12 and the outer flange 24.

Figure 6:
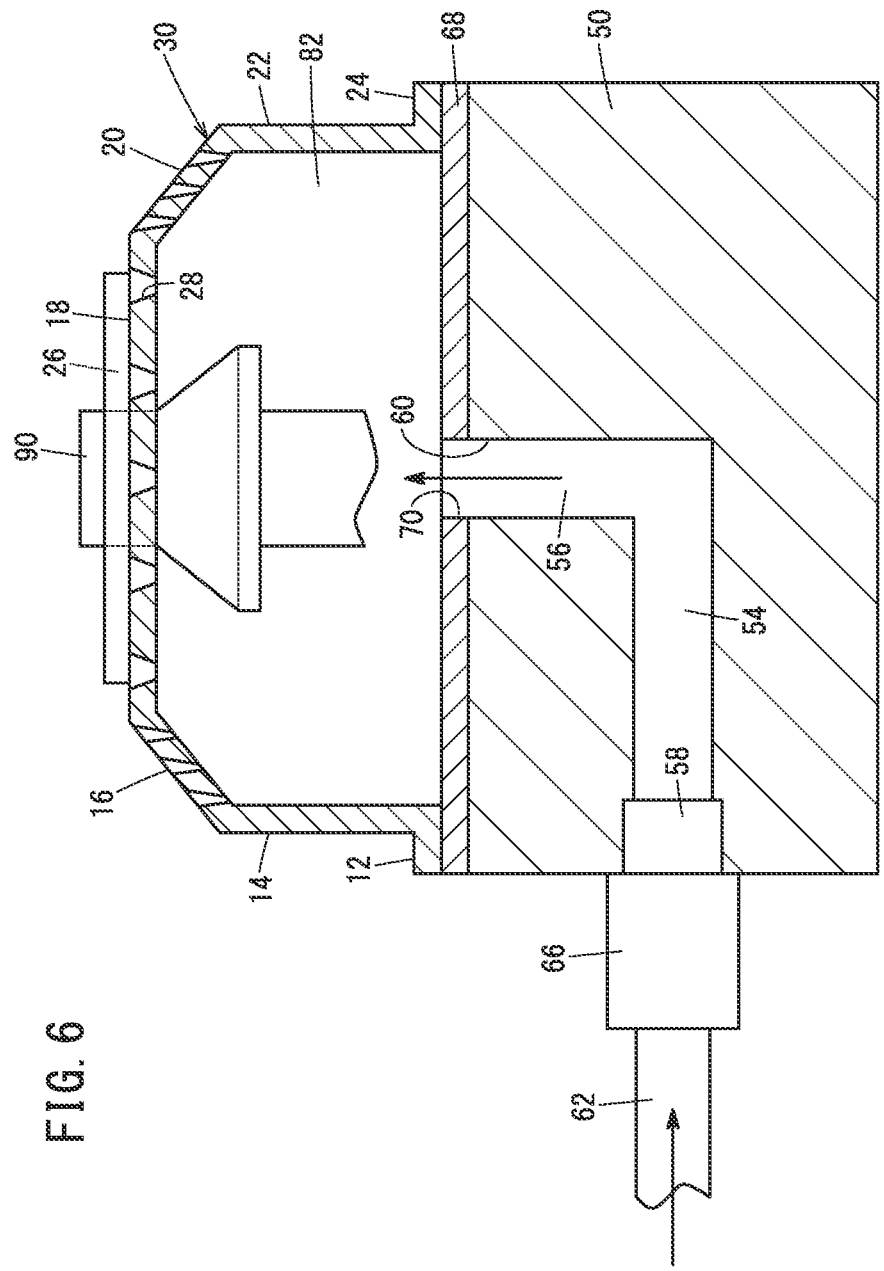
FIG. 6 is a cross-sectional view taken along the line VI-VI in FIG. 5, and looking in the direction of the arrows.

Due to the inner flange 12, the inner vertical wall 14, the inner inclined wall 16, the cover portion wall 18, the outer inclined wall 20, the outer vertical wall 22, and the outer flange 24 being joined up as described above, the ring body 10 has a substantially hat-shaped cross section in the diametric direction (refer to FIG. 6). Moreover, the cover portion wall 18 has a plurality of fuel supply holes 26 (openings) formed therein so as to be separated at substantially equal intervals from each other and penetrate along a thickness direction.

In the present embodiment, the ring body 10 is preferably configured from a nickel (Ni)-based alloy. This is because nickel-based alloys excel in heat resistance properties, and, moreover, because molding processing of nickel-based alloys is comparatively easy due to them having good malleability. From a viewpoint of further improving heat resistance properties, a nickel-based alloy containing cobalt (Co) as a component is even more preferable.

Figure 2:
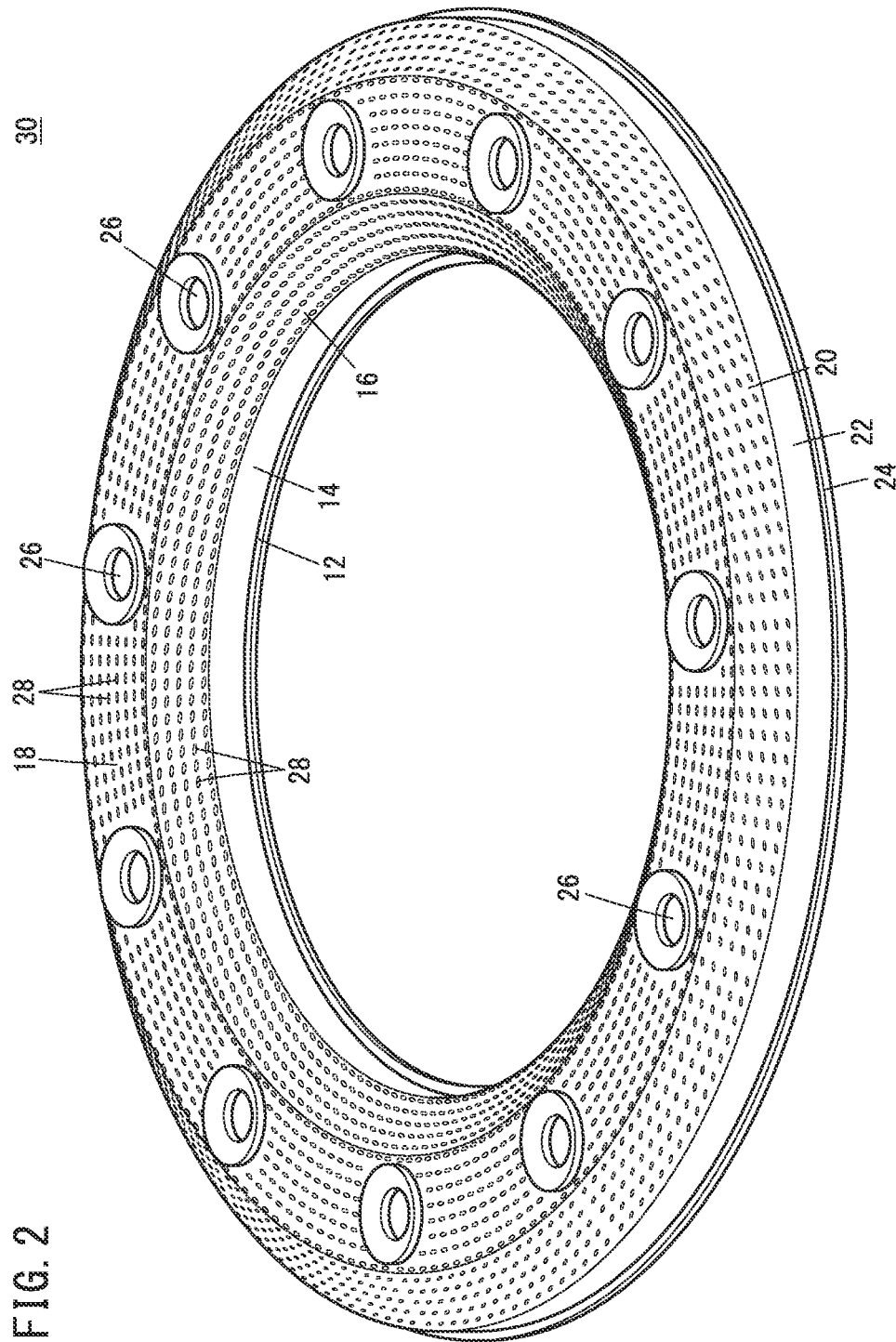
FIG. 2 is a schematic overall perspective view of a dome portion obtained by forming cooling through-holes (through-holes) in the ring body.

The ring body 10 has formed therein a plurality of fine cooling through-holes (hereafter, sometimes also written as "cooling holes") 28 shown in FIG. 2, due to a later-mentioned laser processing being implemented. As a result, a dome portion 30 of a combustor configuring an unillustrated gas turbine engine is obtained as a hole-opened member. The dome portion 30 is joined to an opening end of an unillustrated liner configuring the combustor, and becomes a cover portion of the liner.

Figure 3:
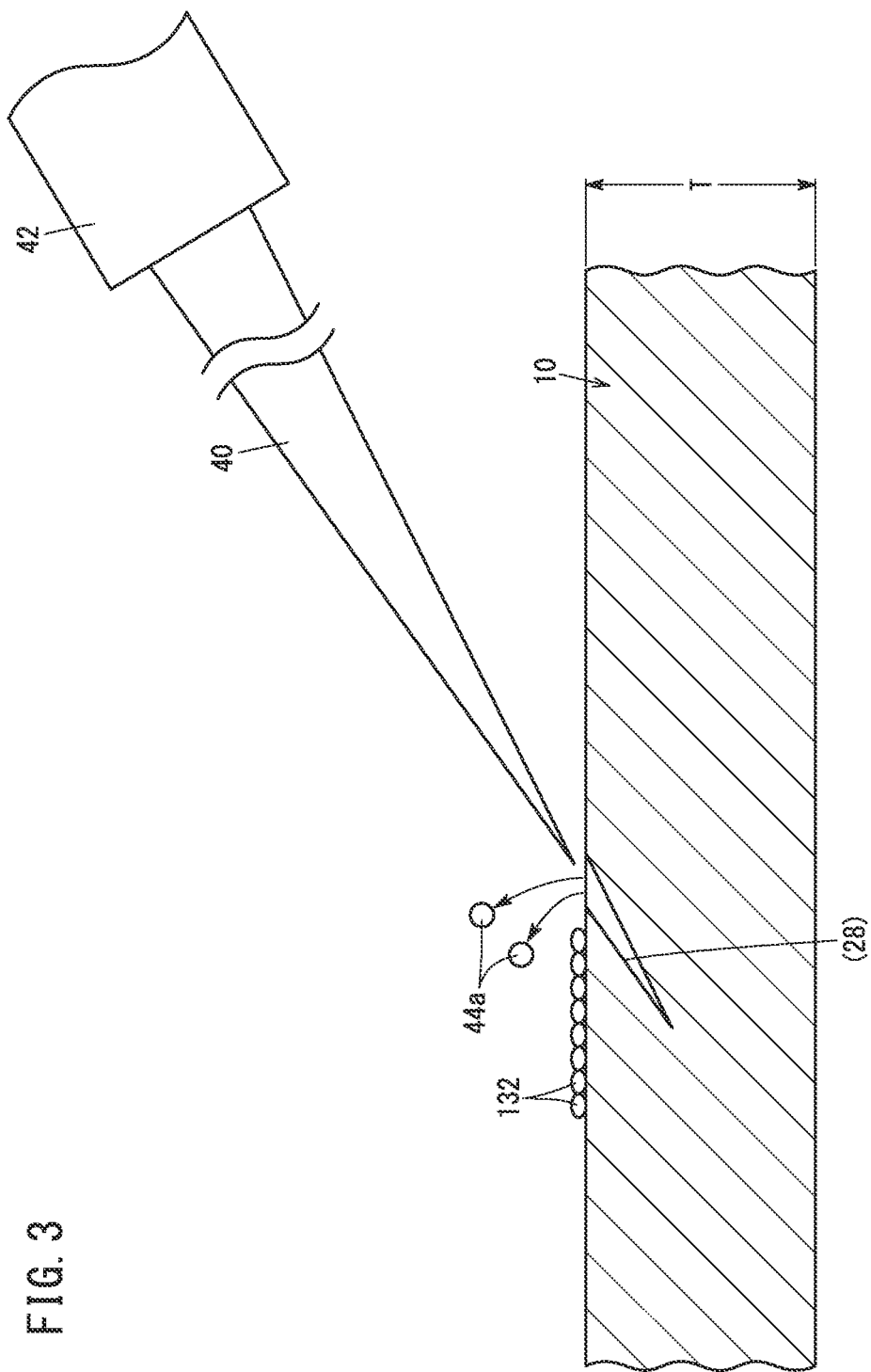
FIG. 3 is a side schematic view showing a state where the ring body is being irradiated with a laser beam in order to perform a laser processing step.

FIG. 3 is a side schematic view showing a state where laser processing is being implemented on the ring body 10. A laser processing device has: an unillustrated support stand; and an irradiating portion 42 that outputs a laser beam 40. The ring body 10 is held on the support stand. Note that a configuration may be adopted whereby the ring body 10 is fixed to and positioned on the support stand.

The irradiating portion 42 is arranged in a position at which an intersection angle θ with respect to a surface (for example, an outer surface of the cover portion wall 18) of the ring body 10 will be more than 0° but less than 90°. That is, the irradiating portion 42 is inclined with respect to the surface of the ring body 10. Hence, the laser beam 40 irradiated from the irradiating portion 42 also enters the surface of the ring body 10 inclined with respect to the surface. As will be mentioned later, part of the ring body 10 melts due to the laser beam 40, as a result of which the cooling hole 28 as the through-hole is formed. Note that typical examples of each of the intersection angle θ, an overall length L of the cooling hole 28 (refer to FIG. 9), and a thickness T of the ring body 10 are, respectively, about 10° to 40°, about 8 to 15 mm, and about 3 to 4 mm.

When performing laser processing, part of a substance of the ring body 10 melts, whereby spatters 44a are generated. When these spatters 44a adhere to the ring body 10 to cool and solidify, they become a foreign body referred to as dross 46 (refer to FIG. 9). Next, the dross removing device as the foreign body removing device for removing this dross 46, will be described. Note that an object from which the dross 46 is to be removed, that is, the workpiece is the dome portion 30 in which the cooling holes 28 have been formed by laser processing.

Figure 4:
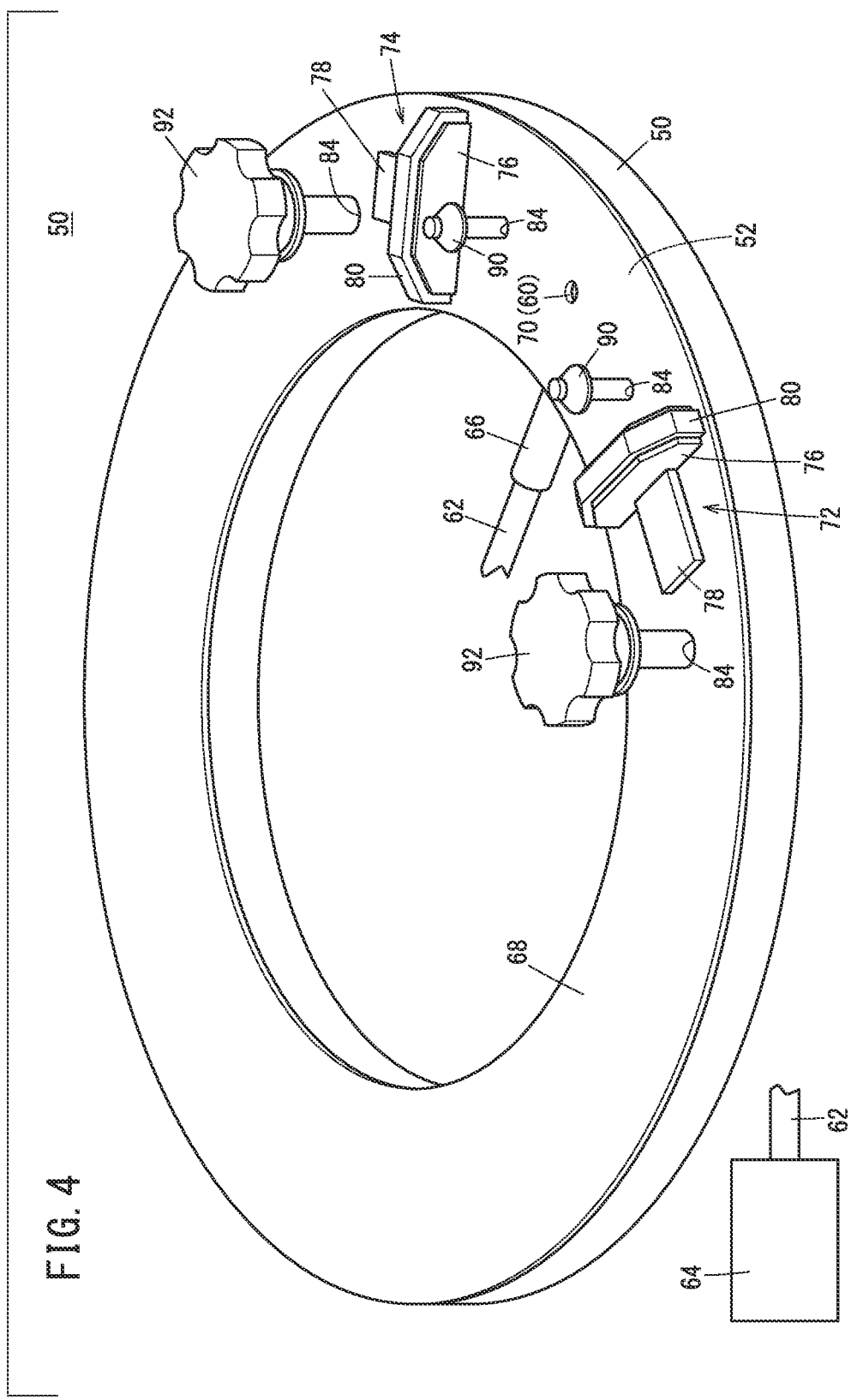
FIG. 4 is an overall schematic perspective view of a base configuring a foreign body removing device.
Figure 5:
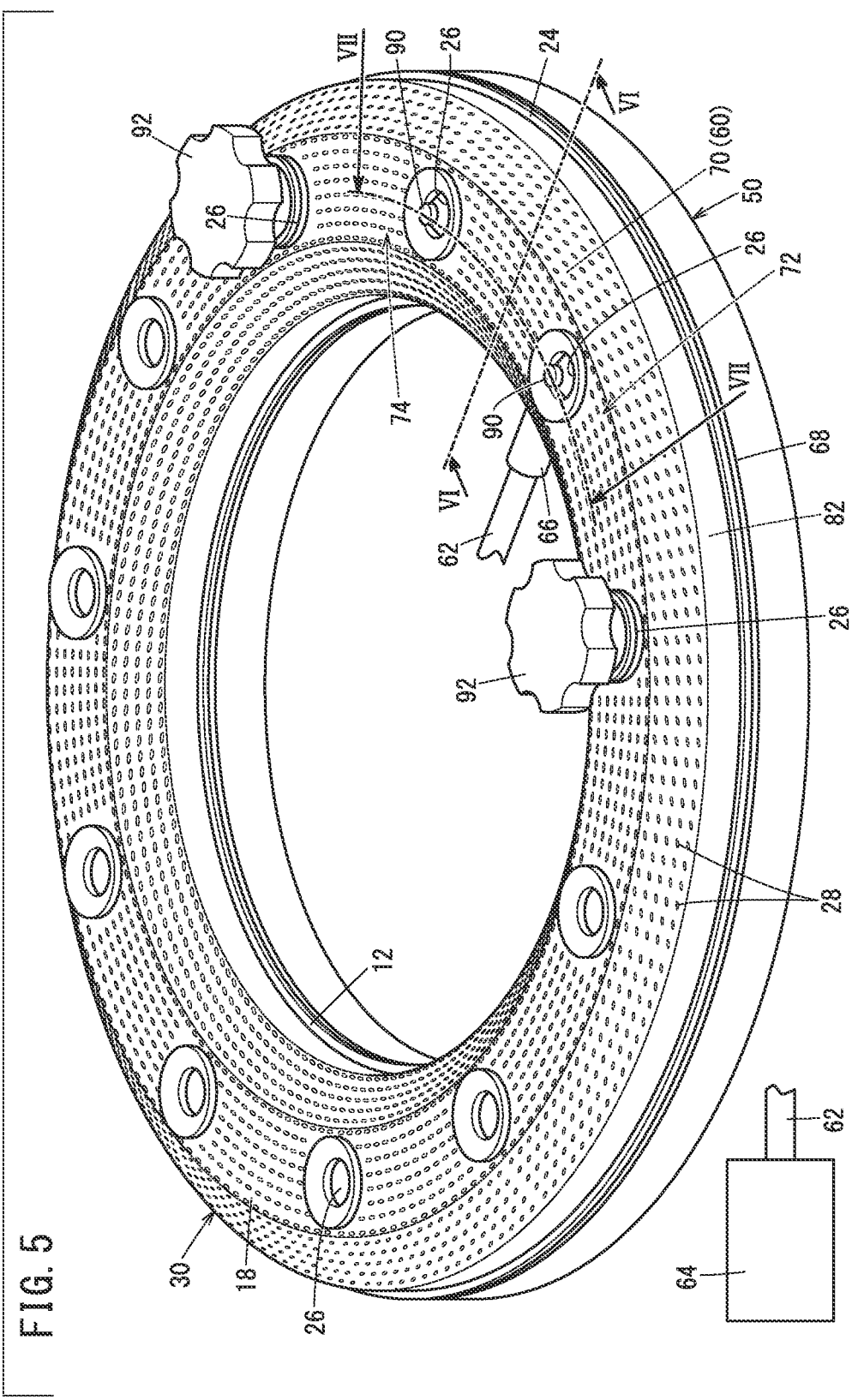
FIG. 5 is an overall schematic perspective view of the dome portion that has been placed on the base.
Figure 7:
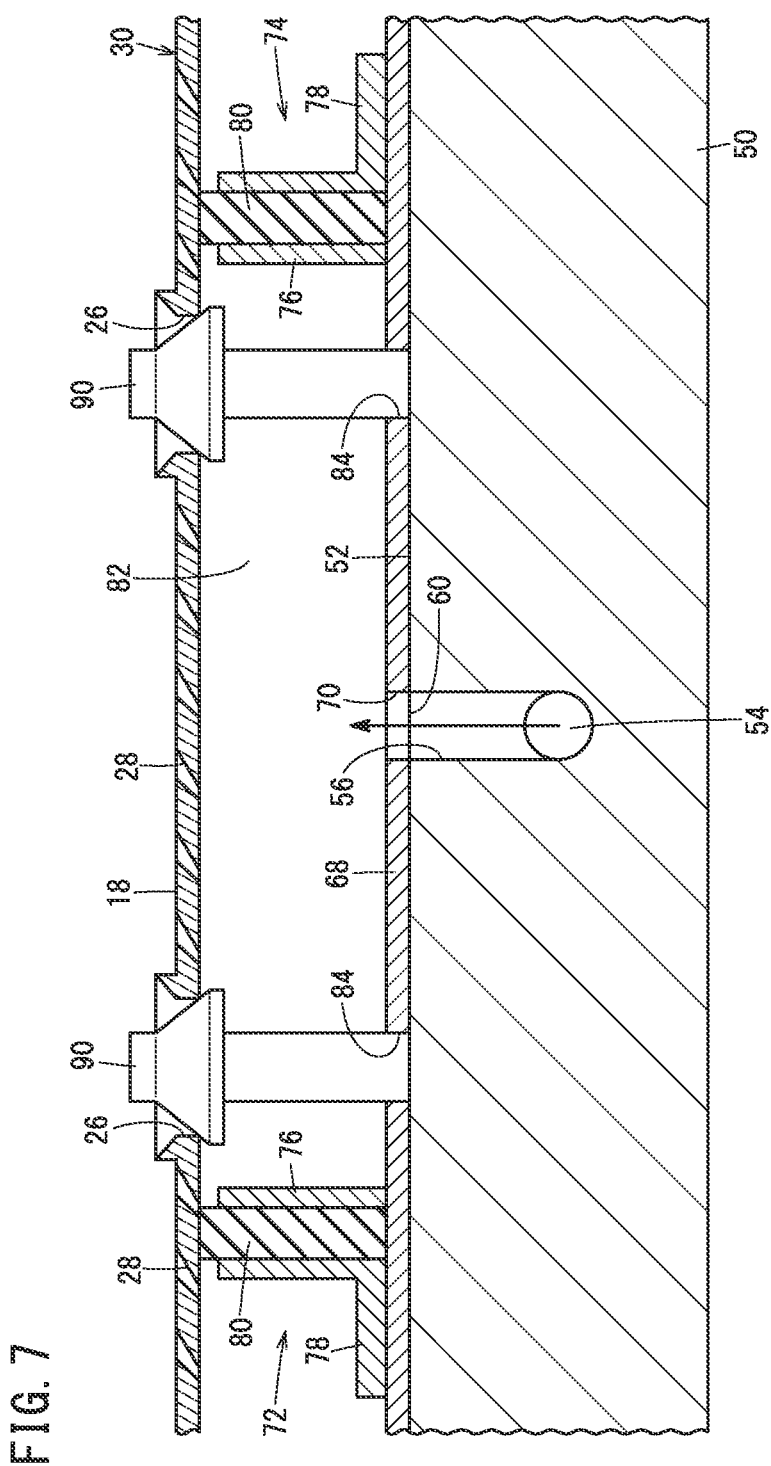
FIG. 7 is a cross-sectional view taken along the line VII-VII in FIG. 5, and looking in the direction of the arrows.

FIG. 4 is an overall schematic perspective view of a base 50 configuring the dross removing device, and FIG. 5 is an overall schematic perspective view of the dome portion 30 that has been placed on the base 50. The base 50 is configured from a circular ring-shaped body whose inner diameter substantially matches a distance (an inner diameter) from a center of the dome portion 30 (the ring body 10) to an inner edge of the inner flange 12 of the dome portion 30, and whose outer diameter substantially matches a distance (an outer diameter) from the center of the dome portion 30 to an outer edge of the outer flange 24 of the dome portion 30. An upper bottom surface of the base 50 is a holding portion 52 on which the dome portion 30 is placed. Note that in FIGS. 5 to 7, illustration of the dross 46 is omitted.

As shown in FIG. 6 which is a cross-sectional view taken along the line VI-VI in FIG. 5 looking in the direction of the arrows, the base 50 has formed therein: a horizontal flow path 54 directed from an inner peripheral wall toward an outer peripheral wall; and a vertical flow path 56 substantially orthogonal to the horizontal flow path 54. As a result of the mutually-communicating horizontal flow path 54 and vertical flow path 56, a flow passage is formed. An air supply port 58 being an inlet opening of the horizontal flow path 54 is positioned in the inner peripheral wall of the base 50, and an air emission port 60 being an outlet opening of the vertical flow path 56 is positioned in the holding portion 52.

A compressed gas supply source 64 is connected to the air supply port 58 via a supply pipe 62. Specifically, one end of the supply pipe 62 is connected via a pipe joint 66 to the air supply port 58, and the other end of the supply pipe 62 is connected to the compressed gas supply source 64. Therefore, compressed gas that has been supplied from the compressed gas supply source 64 is introduced to the horizontal flow path 54 from the air supply port 58 via the supply pipe 62 and the pipe joint 66, and then flows along the vertical flow path 56. Note that as a typical example of the compressed gas supply source 64, there may be cited an air compressor that compresses atmospheric air to configure compressed air.

The holding portion 52 is provided with a ring-shaped seal member 68, and the ring-shaped seal member 68 has formed therein a seal side outlet 70 that overlaps the air emission port 60. Therefore, the compressed gas that has flowed along the vertical flow path 56 passes through the air emission port 60 to be emitted from the seal side outlet 70. Now, the ring-shaped seal member 68 is for sealing between each of the inner flange 12 and outer flange 24, and the holding portion 52.

As shown in FIG. 4, a first partitioning portion 72 and a second partitioning portion 74 are disposed on the holding portion 52 so as to be separated from each other by a certain interval. The first partitioning portion 72 has: a partition-forming wall 76; and a thin tongue-piece portion 78 extending out from the partition-forming wall 76. The tongue-piece portion 78 is coupled to the holding portion 52 via a bolt, whereby the first partitioning portion 72 is fixed and positioned on the holding portion 52. On the other hand, the partition-forming wall 76 has a shape conforming to an inner surface shape of the dome portion 30, and has a belt-shaped seal member 80 mounted on its side peripheral wall. The second partitioning portion 74 too is configured similarly to the first partitioning portion 72, hence the same configuring elements thereof will be assigned with the same reference symbols, and detailed descriptions thereof will be omitted.

The partition-forming walls 76 of the first partitioning portion 72 and the second partitioning portion 74 face each other. Moreover, the belt-shaped seal member 80 abuts on inner surfaces of the inner vertical wall 14, inner inclined wall 16, cover portion wall 18, outer inclined wall 20, and outer vertical wall 22 of the dome portion 30. Therefore, a space between the partition-forming walls 76 of the first partitioning portion 72 and second partitioning portion 74, a region of the dome portion 30 corresponding to the space between the partition-forming walls 76, and the holding portion 52 (or the ring-shaped seal member 68 on the holding portion 52) jointly form a hollow inner chamber 82, as shown in FIG. 7 which is a cross-sectional view taken along the line VII-VII in FIG. 5 looking in the direction of the arrows. The air emission port 60 and the seal side outlet 70 are positioned in the inner chamber 82.

In addition to there being formed in the holding portion 52 a bolt hole into which the bolt for coupling the tongue-piece portion 78 is screwed, the holding portion 52 has formed therein two first pin holes positioned in the inner chamber 82, and two second pin holes positioned so as to sandwich the first partitioning portion 72 and the second partitioning portion 74. Of course, the ring-shaped seal member 68 has insertion holes 84 respectively formed therein at positions overlapping the bolt hole, the first pin holes, and the second pin holes. Note that none of the bolt hole, the first pin holes, and the second pin holes are illustrated.

Lower ends of plug members 90 are detachably fitted into the first pin holes. Upper ends of the plug members 90 block the two fuel supply holes 26 positioned in the inner chamber 82, of the plurality of fuel supply holes 26. On the other hand, lower ends of stoppers 92 for securing and positioning the dome portion 30 are detachably inserted into the second pin holes. The stoppers 92 pass through the two fuel supply holes 26 positioned on an outer side of the inner chamber 82 and closest to the inner chamber 82, of the plurality of fuel supply holes 26.

Figure 8:
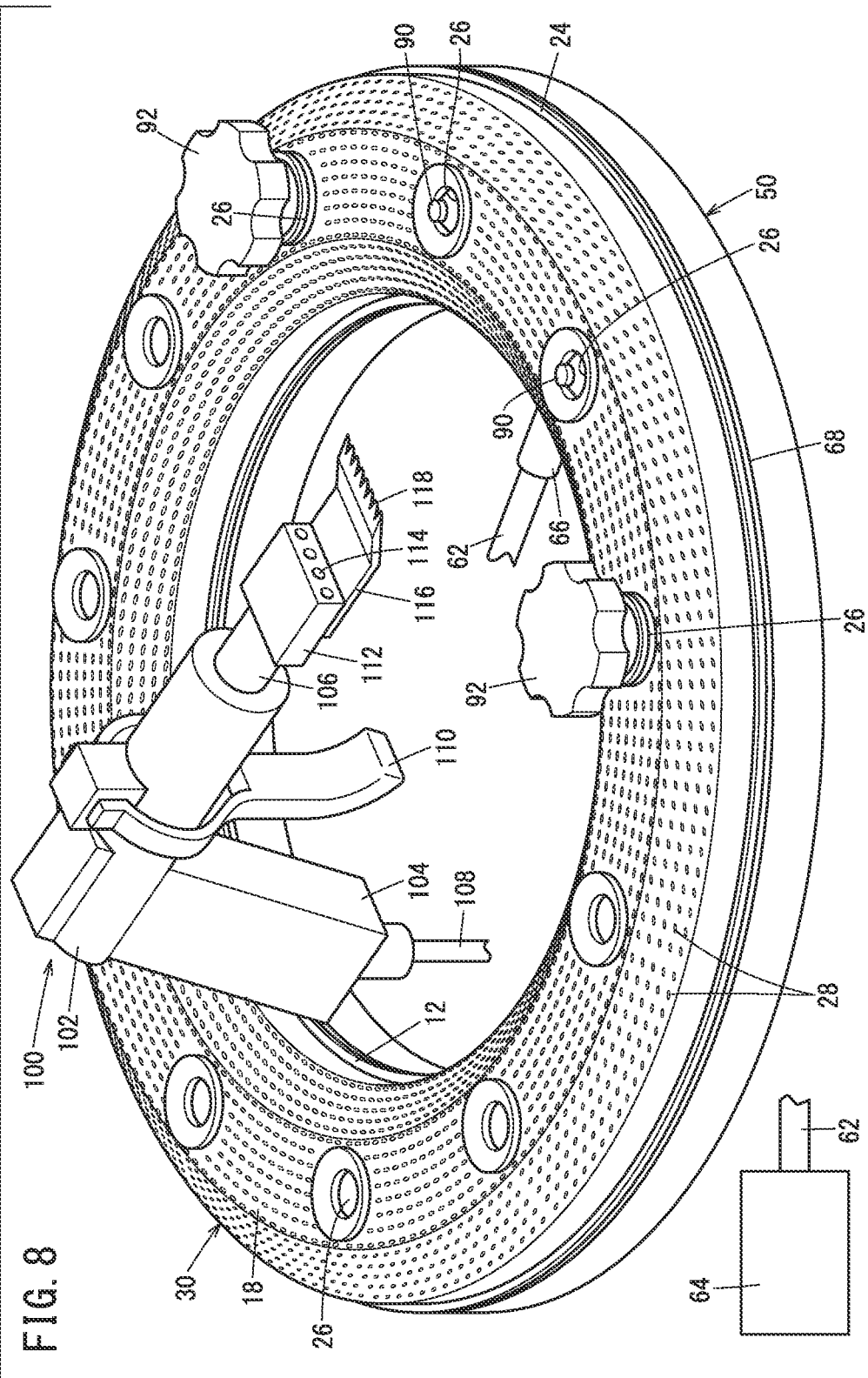
FIG. 8 is an overall schematic perspective view of a first foreign body removing tool configuring the foreign body removing device.

The dross removing device further comprises a first foreign body removing tool (hereafter, also written simply as "first tool") 100 shown in FIG. 8. This first tool 100 has a gun-shaped housing 102. The housing 102 is configured including: a handle 104 being a grip configured to be gripped by a worker; and a barrel 106 joined on to the handle 104 so as to be bent substantially orthogonally to the handle 104. A lower portion of the handle 104 has connected thereto a flexible tube 108 along which the compressed gas that has started out from the compressed gas supply source 64 flows. The compressed gas that has been supplied via the flexible tube 108 flows along toward the barrel 106 from the handle 104.

A trigger 110 is provided in a manner enabling it to pivot or swing with respect to the housing 102, in a vicinity of a boundary of the handle 104 and the barrel 106. Moreover, a tip of the barrel 106 is fitted with a nozzle box 112. By the worker pulling (turning) the trigger 110 toward a handle 104 by their fingers, an unillustrated valve housed within the housing 102 opens. As a result, distributed compressed gas is delivered as an airflow from a plurality of discharge holes 114 formed in the nozzle box 112. On the other hand, when the worker releases their fingers from the trigger 110, the trigger 110 returns to its original position, whereby the valve closes. Thus, discharge of the compressed gas from the discharge holes 114, in other words, delivery of the airflow is stopped.

A lower portion of the nozzle box 112 is provided with a plate-shaped combing blade 116 (a blade). The combing blade 116 is slightly longer compared to the nozzle box 112, hence a tip of the combing blade 116 projects from the nozzle box 112. This projecting tip bends slightly toward a nozzle box 112 side with increasing separation from the barrel 106.

The tip projecting from the nozzle box 112, of the combing blade 116, has, formed thereon, a cutting portion 118 for detaching or removing the dross 46 from the surface of the dome portion 30. In this case, the cutting portion 118 has a combtooth shape having concave portions and convex portions alternately lined up thereon. The discharge holes 114 are formed in a vicinity of a start end portion of the cutting portion 118, hence the airflow that has been discharged from the discharge holes 114 advances toward the cutting portion 118. Thus, the nozzle box 112 plays a role as an airflow delivering portion delivering the airflow toward the cutting portion 118 of the combing blade 116.

In the present embodiment, the dross removing device, which is basically configured as above, will next have its operational advantages described in relation to a process of manufacturing the dome portion 30.

First, in order to obtain the dome portion 30, the ring body 10 that has been pre-formed with the fuel supply holes 26 undergoes laser processing, and has the cooling holes 28 formed therein. In order for that to be done, first, the ring body 10 is held on the support stand. A configuration may be adopted whereby at this time, the ring body 10 is fixed to and positioned on the support stand. Then, as shown in FIG. 3, the laser beam 40 is outputted from the irradiating portion 42 that has been set such that the intersection angle θ with respect to the surface (for example, the outer surface of the cover portion wall 18) of the ring body 10 will be more than 0° but less than 90°, and will typically be about 10° to 40°, and a laser processing step is started.

A region, of the ring body 10, irradiated by the laser beam 40 melts by being heated by the laser beam 40. Due to this melting, spatters 44a are generated and thereby scatter. The spatters 44a attain a solid phase in a short time, and in this state, adhere to the surface of the ring body 10 to form an initial dross layer 132.

Melting of part of the ring body 10 advances along an entering direction of the laser beam 40, whereby one cooling hole 28 inclined with respect to the thickness direction of the ring body 10 is formed. Thereafter, the above-described laser processing step is repeated while a position of the irradiating portion 42 is changed, and a plurality of the cooling holes 28 are formed. As a result, the dome portion 30 is obtained.

Figure 9:
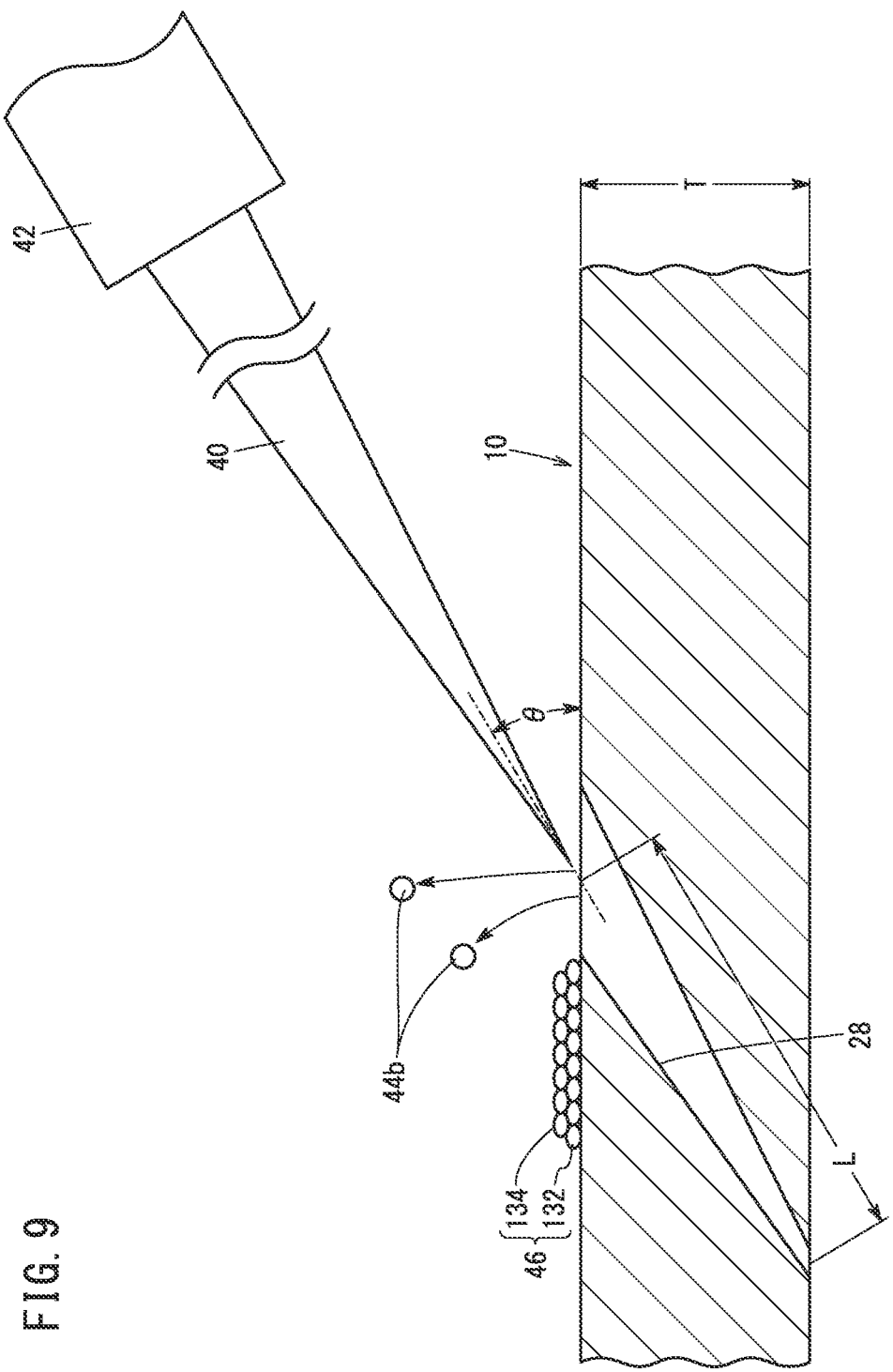
FIG. 9 is a side schematic view showing a state where the laser processing step has progressed more from FIG. 3.

As the above-described melting advances, spatters 44b scatter as shown in FIG. 9. The spatters 44b are deposited on top of the initial dross layer 132, and form a later dross layer 134. That is, at a time point when a dome portion having a target number of cooling holes 28 formed therein has been obtained as the dome portion 30, a surface of the dome portion 30 will have adhered thereto the dross 46 being a deposit of the initial dross layer 132 and the later dross layer 134.

Next, a foreign body removing step for removing the dross 46, which is the deposit, is performed. In this foreign body removing step, the above-described dross removing device is employed. Specifically, the dome portion 30 with the deposit (the dross 46), i.e., the foreign body, adhering to a surface thereof is placed on the holding portion 52 of the base 50 of the dross removing device. At this time, lower surfaces of the inner flange 12 and outer flange 24 abut on an upper surface of the ring-shaped seal member 68, while the inner vertical wall 14, the inner inclined wall 16, the cover portion wall 18, the outer inclined wall 20, and the outer vertical wall 22 are separated from the upper surface of the ring-shaped seal member 68. Hence, the ring-shaped seal member 68 seals between the inner flange 12 and outer flange 24, and the holding portion 52.

Moreover, the belt-shaped seal members 80 mounted on the respective partition-forming walls 76 of the first partitioning portion 72 and second partitioning portion 74 abut on the inner vertical wall 14, the inner inclined wall 16, the cover portion wall 18, the outer inclined wall 20, and the outer vertical wall 22. This abutting causes the region of the dome portion 30 corresponding to the space between the partition-forming walls 76, and the holding portion 52 (or the ring-shaped seal member 68 on the holding portion 52) to form the inner chamber 82 shown in FIGS. 6 and 7.

Furthermore, the upper ends of the plug members 90 that have been uprightly arranged in advance on the holding portion 52 block two fuel supply holes positioned in the inner chamber 82, of the fuel supply holes 26. As a result, the inner chamber 82 becomes a closed space. Moreover, the two fuel supply holes 26 positioned on the outer side of the inner chamber 82 and closest to the inner chamber 82 are passed through by the stoppers 92. As described above, the lower ends of the stoppers 92 are fitted into the second pin holes formed in the holding portion 52. As a result, the dome portion 30 is fixed and positioned via the stoppers 92.

In this state, compressed gas is supplied from the compressed gas supply source 64. The compressed gas is introduced to the horizontal flow path 54 from the air supply port 58 via the supply pipe 62 and the pipe joint 66, and, furthermore, passes through the vertical flow path 56 to be introduced to the inner chamber 82 from the air emission port 60 and the seal side outlet 70. Since the fuel supply holes 26 are blocked by the plug members 90, the compressed gas flows through the cooling holes 28. Since the dross 46 is comparatively porous, the compressed gas passes through pores within the dross 46 to be diffused into the atmosphere. Capacity of the inner chamber 82 is sufficiently smaller compared to that of an inner space formed by the holding portion 52 and an entire periphery of the dome portion 30. Therefore, internal pressure of the inner chamber 82 sufficiently increases, so the compressed gas that passes through the cooling holes 28 and inside the dross 46 can be set to a comparatively high pressure.

Next, the worker grasps the handle 104 of the first tool 100, and directs the nozzle box 112 and the cutting portion 118 of the combing blade 116 toward the dross 46 on an outer peripheral wall side. In order for the dross 46 to be removed as much as possible from the dome portion 30, the cutting portion 118 is preferably brought into contact with the initial dross layer 132.

Figure 10:
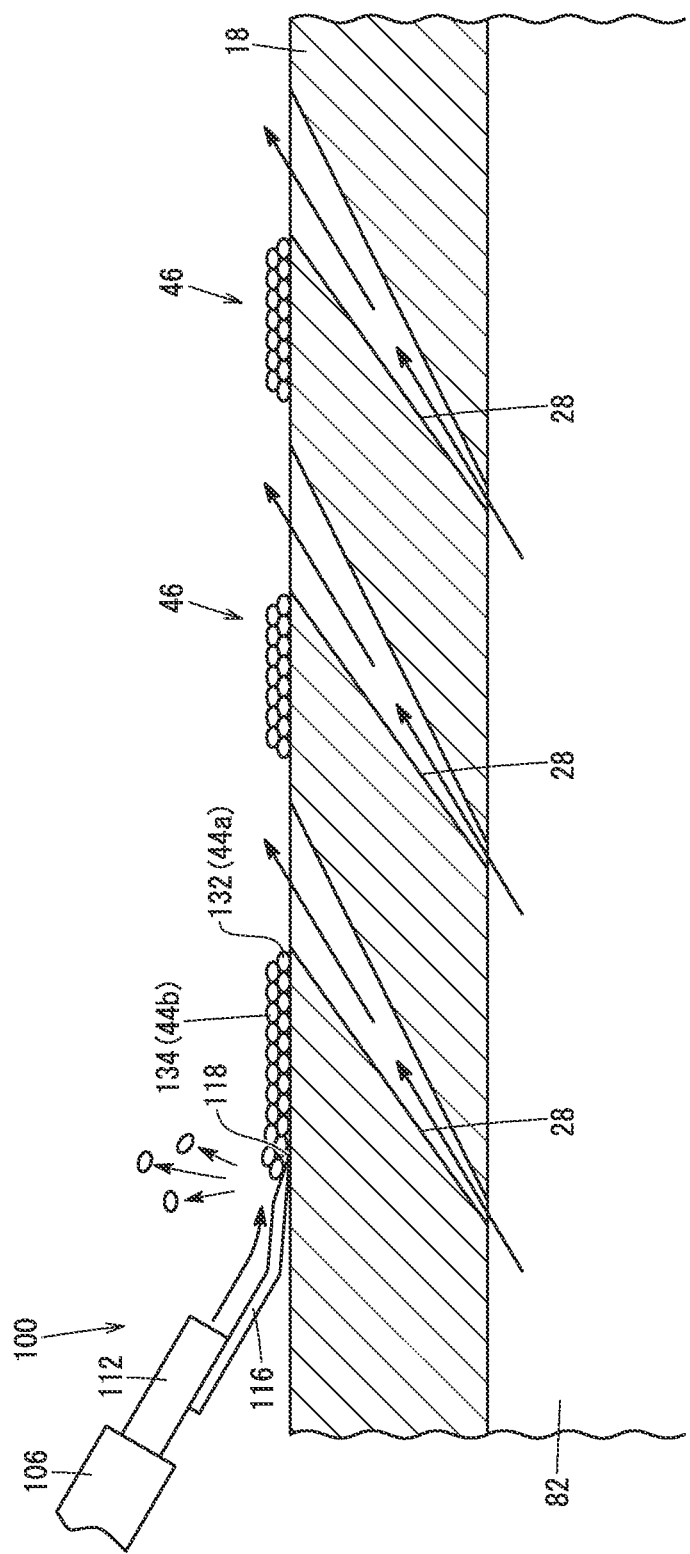
FIG. 10 is a side schematic view showing a state where dross being a foreign body is being removed from the dome portion by the first foreign body removing tool.

Then, the worker pulls the trigger 110 toward the handle 104 by their fingers, whereby the valve within the housing 102 is set to an open state. As a result, the compressed gas that has been supplied from the compressed gas supply source 64 flows from the handle 104 through the barrel 106, and further through the nozzle box 112. As shown in FIG. 10, the compressed gas is discharged toward the cutting portion 118 from the plurality of discharge holes 114 formed in the nozzle box 112. That is, an airflow in the direction toward the cutting portion 118 occurs. In this state, the worker moves the first tool 100 from the outer peripheral side toward the inner peripheral side (or vice versa).

At this time, a crack is formed between the dross 46 (for example, the initial dross layer 132) that has been pressed on by the cutting portion 118 and the surface of the dome portion 30. Then, the dross 46 in which the crack has been formed is struck by the airflow supplied from the discharge holes 114 of the nozzle box 112. As a result, the dross 46 disintegrates starting with the crack, and peels (separates) from the surface of the dome portion 30.

As may be understood from the above, in this case, when removing the dross 46, there is no need for an excessive force to be applied to the first tool 100 or for vigorous scraping to be performed. It is thus possible to avoid a situation that the surface of the dome portion 30 is shaved by the cutting portion 118 or that openings of the cooling holes 28 are resultantly blocked as in conventional technology where the dross 46 is scraped using a file or the like. It is therefore also possible to avoid a situation that the number of cooling holes 28 decreases and cooling efficiency thereby drops.

Now, as well as the compressed gas being supplied to the inner chamber 82, the compressed gas flows along insides of the cooling holes 28 toward outside of the dome portion 30. That is, the compressed gas is discharged from the cooling holes 28. Moreover, this compressed gas has a comparatively high pressure as has been described above. It is therefore avoided that the dross 46 that has been removed intrudes into the cooling holes 28 and the cooling holes 28 are thereby blocked. Moreover, the dome portion 30, cutting portion 118, and so on, are cooled by the compressed gas. In this case, there is an advantage that removal of the dross 46 becomes easier compared to when cooling is not performed. Note that the airflow delivered from the discharge holes 114 of the nozzle box 112 also contributes to cooling of the dome portion 30, cutting portion 118, and so on.

When removing the dross 46 that has adhered to another region of the dome portion 30, the stoppers 92 are loosened to rotate the dome portion 30, and the region where the dross 46 is unremoved is set facing the first partitioning portion 72 and the second partitioning portion 74. Thereafter, the dross 46 should be removed similarly to as described above. This is repeated to obtain a dome portion 30 that has had the dross 46 removed over its entire periphery, and in which blocking of the cooling holes 28 by the dross 46 has been avoided. By joining this dome portion 30 to the liner, there can be obtained a combustor that excels in cooling efficiency. This is because since it is avoided that the cooling holes 28 are blocked by the dross 46 as described above, heat can be efficiently diffused via the dome portion 30.

Figure 11:
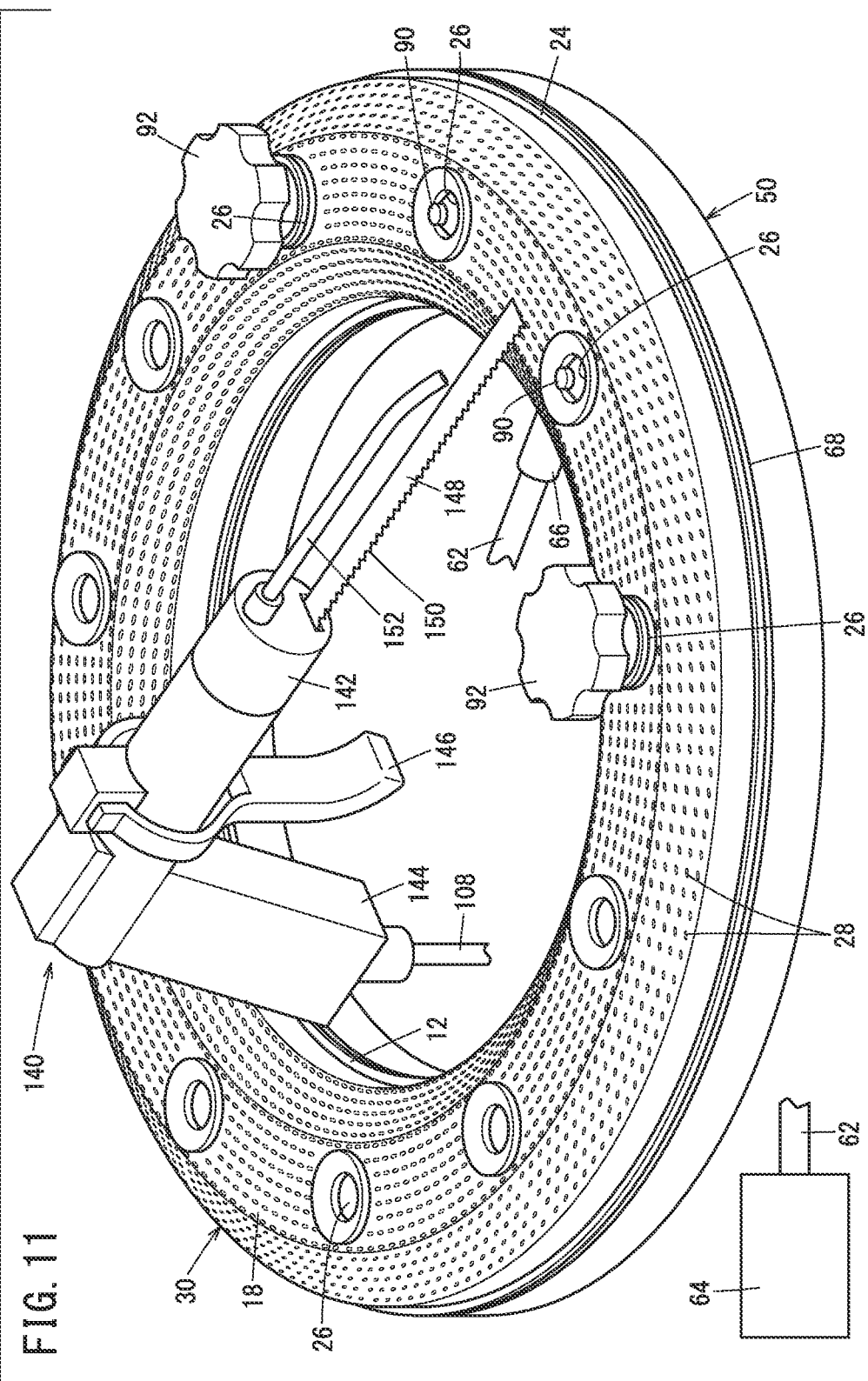
FIG. 11 is an overall schematic perspective view of a second foreign body removing tool configuring the foreign body removing device.

It is possible to configure so that a second tool 140 shown in FIG. 11 is adopted as the foreign body removing device, instead of the above-described first tool 100. Next, a description will be given concerning the second tool 140.

In the second tool 140, one end of a bar-shaped casing 142 will be a handle 144. In this case, the worker grasps in an enveloping manner the handle 144 and a trigger 146, and pulls the trigger 146 to a handle 144 side by their fingers. As a result, a valve within the casing 142 attains an open state. On the other hand, if the worker loosens their fingers, the trigger 146 will revolve in a direction of separating from the handle 144, and the valve will attain a closed state.

Figure 12:
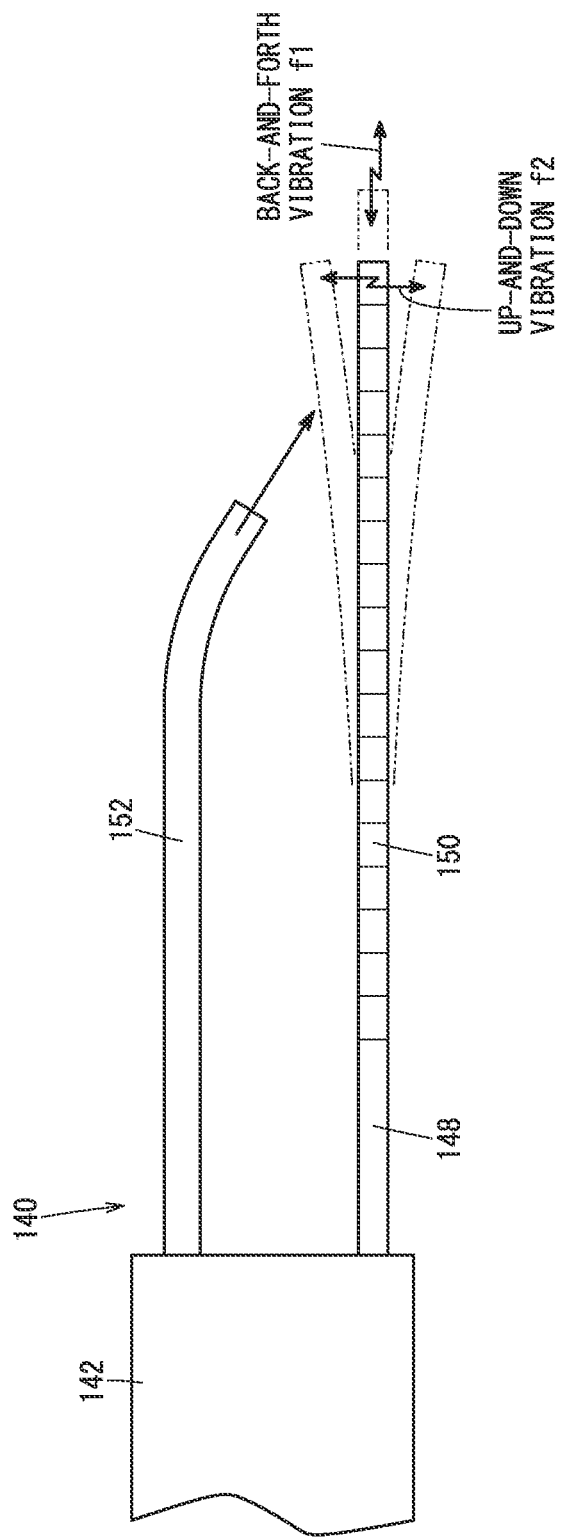
FIG. 12 is a side schematic view showing vibration directions of a blade configuring the second foreign body removing tool.

Moreover, one end of a jigsaw blade 148 which acts as the blade is attached to the other end of the casing 142 in a manner enabling it to be advanced and retracted. That is, due to an unillustrated advancing and retracting mechanism provided within the casing 142, the jigsaw blade 148 is capable of repeating an advancing/retracting operation with a certain frequency f1, in other words, vibrating back-and-forth, along an extension direction of the casing 142, as shown in FIG. 12. Note that the jigsaw blade 148 has a sawtooth-shaped cutting portion 150.

The second tool 140 has a jet pipe 152 that extends substantially in parallel to the jigsaw blade 148 and has one end thereof connected to the compressed gas supply source 64. A tip of the jet pipe 152 is bent so as to approach a tip of the jigsaw blade 148. Therefore, when compressed gas (an airflow) is discharged from the jet pipe 152, the compressed gas contacts the jigsaw blade 148. Due to this contact, the tip of the jigsaw blade 148 is repeatedly flexed in a direction orthogonal to an extension direction of the jigsaw blade 148. That is, the tip of the jigsaw blade 148 is capable too of repeating an advancing/retracting operation with a certain frequency, in other words, vibrating up-and-down, along the direction orthogonal to the extension direction of the jigsaw blade 148. A frequency f2 of up-and-down vibration is about ½ (half) of the frequency f1 of back-and-forth vibration, for example.

A foreign body removing step employing the second tool 140 will be described below. Note that although not having been specifically described, the likes of placement of the dome portion 30 on the holding portion 52 of the base 50, and advantages obtained thereby, are similar to as described above.

Figure 13:
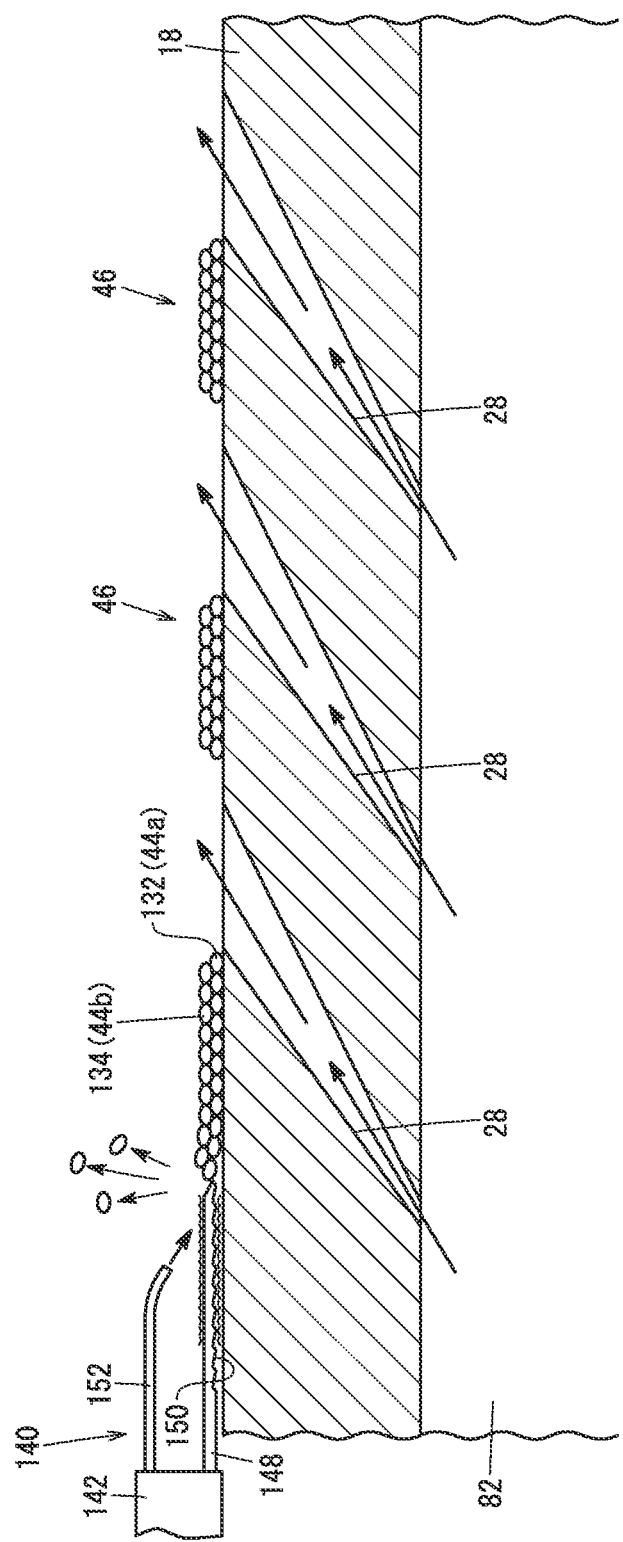
FIG. 13 is a side schematic view showing a state where dross is being removed from the dome portion by the second foreign body removing tool.

In the case of employing the second tool 140, the worker grasps in an enveloping manner the handle 144 and the trigger 146. Then, as shown in FIG. 13, the cutting portion 150 of the jigsaw blade 148 is struck linearly against the dross 46 (for example, the initial dross layer 132) from the outer peripheral side over to the inner peripheral side (or vice versa) of the dome portion 30. An extension direction of the cutting portion 150 of the jigsaw blade 148 should be set to the diametric direction of the ring body 10, for example.

In this state, the worker pulls the trigger 146 toward the handle 144 by their fingers, whereby the valve within the casing 142 is set to the open state. As a result, the compressed gas that has been supplied from the compressed gas supply source 64 flows through an inside of the casing 142, whereby back-and-forth vibration of the jigsaw blade 148 is induced. In addition, the compressed gas is discharged toward the tip of the jigsaw blade 148 from the jet pipe 152. That is, an airflow in a direction toward the cutting portion 150 of the jigsaw blade 148 occurs. This airflow results in the jigsaw blade 148 being pressed, and up-and-down vibration of the jigsaw blade 148 being induced.

Due to the above back-and-forth vibration and up-and-down vibration, a crack is formed in the dross 46 that has been pressed against by the cutting portion 150 (for example, in a space between the initial dross layer 132 and the surface of the dome portion 30), similarly to as described above. Moreover, the dross 46 in which the crack has been formed disintegrates easily due to being struck by the airflow supplied from the jet pipe 152, leading to the dross 46 peeling (separating) from the surface of the dome portion 30. Thus, even when employing the second tool 140, the dross 46 can be easily removed from the dome portion 30.

Note that in whichever case of either the first tool 100 or the second tool 140 being employed, a configuration may be adopted whereby the laser beam 40 irradiates in two stages. In this case, first time irradiation conditions and second time irradiation conditions are preferably made different.

The present invention is not specifically limited to the above-described embodiment, and may be variously altered in a range not departing from the scope of the present invention.

Figure 14:
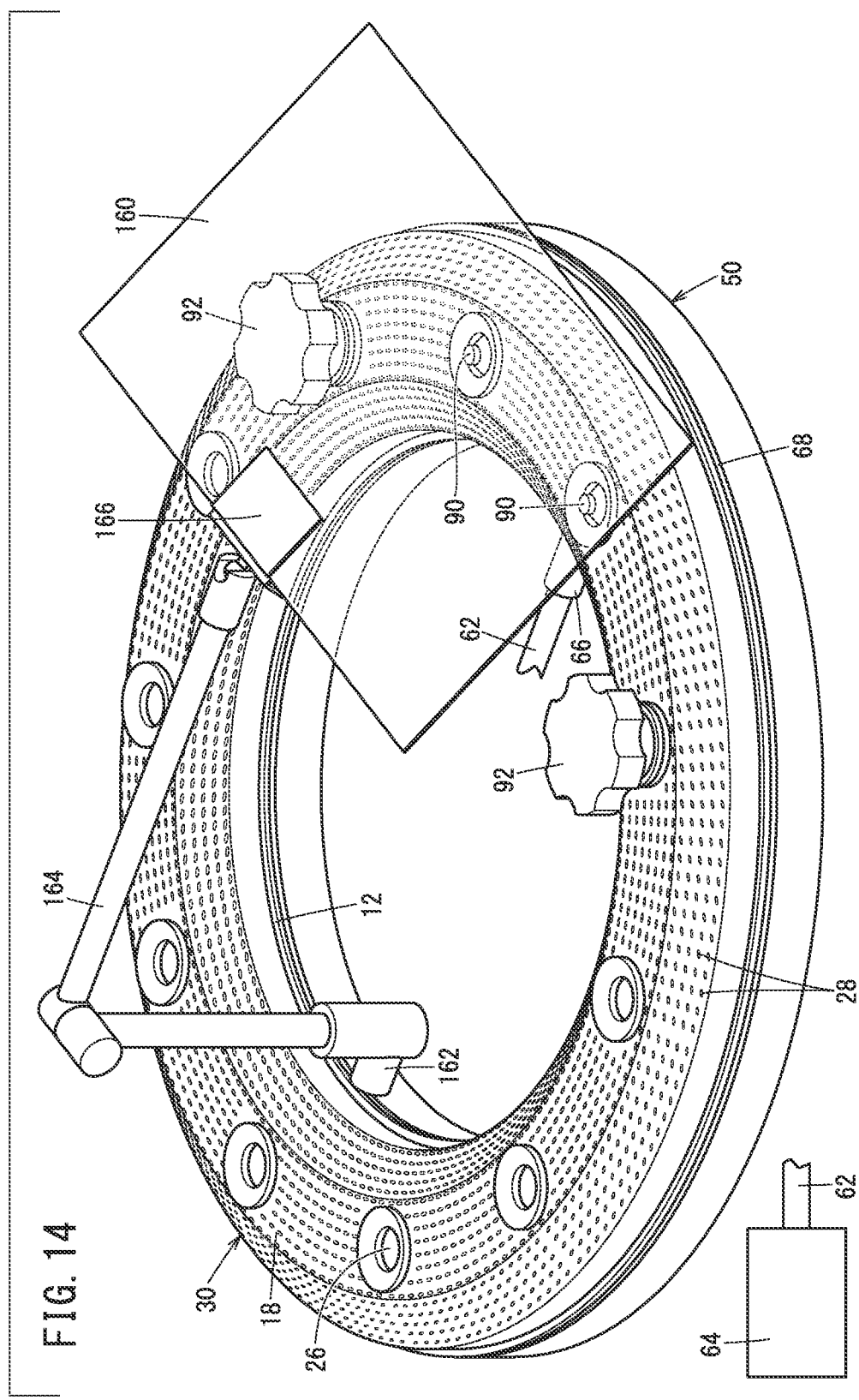
FIG. 14 is an overall schematic perspective view of the dome portion that has been placed on a base provided with an intercepting member.

For example, as shown in FIG. 14, a configuration may be adopted so as to provide an intercepting member 160. In this case, a universal joint 162 is provided at a position separated substantially 180° from the horizontal flow path 54, of the inner peripheral wall of the base 50. This universal joint 162 supports one end of an angle arm 164 whose angle is freely adjustable. Moreover, the screen-shaped intercepting member 160 having a flat plate shape is detachably held on the other end of the angle arm 164 via a clamp 166.

The dross 46 that has peeled from the surface of the dome portion 30 is blown to the outer peripheral side by the airflow discharged from the nozzle box 112 or the jet pipe 152, and falls after contacting the intercepting member 160. Therefore, the dross 46 collects after falling on a downward side of the intercepting member 160, hence cleaning work becomes easy.

Moreover, a configuration may be adopted whereby the air supply port 58 and supply pipe 62, the angle arm 164, and so on, are provided on the outer peripheral wall side of the base 50.

In all cases, the workpiece is not limited to the dome portion 30 of the combustor or the ring body 10 representing the dome portion 30, and may be another member. Moreover, a configuration may be adopted whereby a foreign body other than the dross 46 is removed.

What is claimed is:

1. A foreign body removing device comprising:
a compressed gas supply source;
a foreign body removing tool configured to remove a foreign body that has adhered to a surface of a workpiece,
wherein the foreign body removing tool comprises:
   a grip configured to be gripped by a worker,
   a blade that extends from the grip and that is configured to contact the foreign body, and
   an airflow delivering portion that includes a discharge hole configured to deliver compressed gas that has been supplied from the compressed gas supply source, as an airflow contacting the blade;
a base configured to support the workpiece, wherein on an inside of the base, there is formed a flow passage that is configured to allow second compressed gas from the compressed gas supply source to flow, and the flow passage opens into a hollow portion that is formed between the base and the workpiece when the workpiece is supported upon the base; and
   two partitioning portions, including a first partitioning portion and a second partitioning portion, that are walls that form an inner chamber between the first partitioning portion and the second partitioning portion within the hollow portion,
   wherein the flow passage opens in the inner chamber.

2. The foreign body removing device according to claim 1, wherein the blade has a combtooth-shaped cutting portion.

3. The foreign body removing device according to claim 1, wherein the blade has a sawtooth-shaped cutting portion.

4. The foreign body removing device according to claim 3, wherein the airflow delivering portion supplies the airflow to the cutting portion.

5. The foreign body removing device according to claim 1, further comprising an intercepting member that includes a shielding surface and is configured to capture the foreign body that has been blown by the airflow after separating from the surface of the workpiece.

6. The foreign body removing device according to claim 5, wherein the intercepting member is detachably attached to the base in a manner that a position of the intercepting member is changeable.

7. The foreign body removing device according to claim 1, wherein the foreign body removing device is configured to remove, as the foreign body, dross generated by laser processing.

* * * * *